United States Patent Office 3,019,180
Patented Jan. 30, 1962

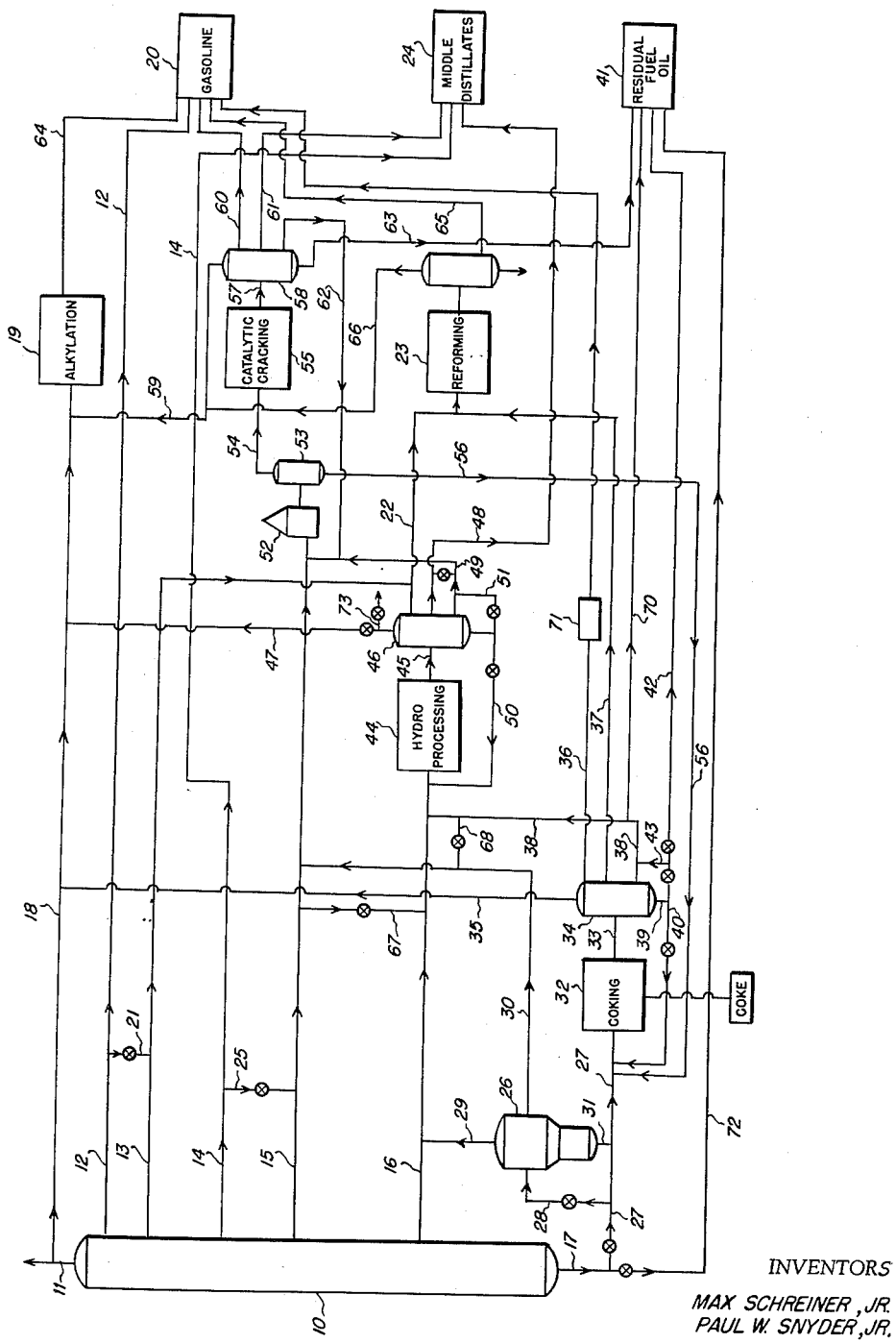

3,019,180
CONVERSION OF HIGH BOILING
HYDROCARBONS
Max Schreiner, Jr., Woodbury, and Paul W. Snyder, Jr., Pitman, N.J., assignors to Socony Mobil Oil Company, Inc., a corporation of New York
Filed Feb. 20, 1959, Ser. No. 794,650
1 Claim. (Cl. 208—51)

This invention relates to the conversion of hydrocarbons, particularly those derived from crude petroleum, shale oil, and the like, into more desirable hydrocarbons, especially gasoline and fuel oil. More particularly, it relates to the conversion of heavy hydrocarbons by a combination of processing steps, including coking, hydrogenation and catalytic cracking.

In substantially all present day oil refineries the primary operation by which heavy hydrocarbons are converted into lower boiling, more desirable products is catalytic cracking. There are several different cracking processes and one of the most widely used is the Thermofor Catalytic Cracking Process, which employs a downwardly moving, substantially compact mass of granular catalytic solids, through which the reactant is passed to effect the desired conversion. The conversion reaction results in the deposition of a carbonaceous contaminant, normally termed coke, on the catalyst which deactivates the catalyst. Deactivated catalyst is removed from the reaction zone and passed to a reconditioning zone in which the coke is removed normally by burning. The reconditioned catalyst is then returned to the reaction zone. With the increased demand for gasoline and middle distillates, such as fuel oil and diesel fuel, in recent years it has been found desirable and often necessary to supply increasing percentages of the crude processed in the refinery to these catalytic cracking units. Above a certain temperature, however, crude hydrocarbons cannot be vaporized at the pressures normally employed in the catalytic cracking reaction without undesirable thermal conversion of the hydrocarbons. If hydrocarbons boiling above this temperature are to be supplied to the catalytic cracking reaction zone, they must, therefore, be supplied as liquid.

This has resulted in an intensive research and development aimed at providing the best and most efficient means of supplying these liquid hydrocarbons to the moving mass of catalyst in the cracking reactor. A number of systems have been developed which achieve this very efficiently. However, there is considerable expense involved in installing any one of these liquid feed systems and, in addition, it is usually not possible to contact all of the catalyst supplied to the moving mass with liquid hydrocarbons. This means that some of the catalyst may contain less coke than the remainder when the reaction is completed, which in turn may lead to problems when the catalyst is regenerated. Frequently, also, temperature differentials across the reaction bed are set up by the liquid feed which result in conversion of a part of the charge at some temperature other than the optimum conversion temperature. It would, therefore, be most desirable if this liquid material could in some manner be altered in boiling range so that it were possible to supply it to the catalytic cracking reactor as a vapor rather than as a liquid.

One technique in the prior art which might accomplish this is the thermal conversion or coking of this heavier material to produce a lighter vaporizable stream and coke. The difficulty with this operation is, however, that the charge stock which might be supplied to the catalytic cracking operation from the coke is quite refractory, i.e., difficult to crack. In addition, any catalyst poisons such as nitrogen and metallic compounds, which might have been in the liquid feed to the thermal conversion, are carried over into the product which could form catalytic cracking feed stock.

The prior art has also suggested that feed stock to catalytic crackers might be hydrogenated to remove therefrom sulfur, nitrogen, metals and other impurities. If, however, it is attempted to convert all of the heavier hydrocarbons into charge stock for the catalytic cracking unit which could be charged to that unit as vapor by cracking in the presence of hydrogen, the consumption of hydrogen is prohibitively high. Hydrogen would have to be manufactured in the refinery in such quantities as to render the entire operation uneconomical.

In addition, the prior art has suggested that all of the gasoline production of a refinery be produced by hydrocracking gas oils. Here again, however, the demand for gasoline is so high that quantities of hydrogen will be required far in excess of those produced by reforming and will, therefore, require expensive hydrogen manufacturing facilities.

This invention makes it possible to convert hydrocarbon material, which could not be vaporized at the catalytic cracking reaction zone pressure without thermal conversion, into gasoline and fuel oil while operating the catalytic cracking reactor on vapor feed only and at a high degree of efficiency. Likewise, it is possible with this invention to make use of the hydrogen produced by reforming without the necessity of installing additional hydrogen manufacturing facilities.

A major object of this invention is the conversion of high boiling hydrocarbons to lower boiling hydrocarbons in an efficient, economical manner.

Another object of this invention is the provision of a process for the conversion of the maximum quantity of heavy hydrocarbons in a crude charge to lower boiling products employing, at least in part, moving mass catalytic conversion operating solely with vapor feed.

These and other objects of this invention are achieved by separating those hydrocarbons from the crude charge which cannot be vaporized at the pressure in the moving mass catalytic cracking zone without thermal conversion. These hydrocarbons are then coked. Liquid products from the coking reaction boiling above naphtha are supplied to a hydroprocessing zone wherein they are reacted with hydrogen to produce a hydroprocessed gas oil. Reaction conditions in the coking zone and the hydroprocessing zone are correlated so that the hydroprocessed gas oil produced can be vaporized at the pressure maintained in the catalytic cracking zone without thermal conversion. The hydroprocessed gas oil is then vaporized and supplied to the catalytic cracking zone.

The term "hydroprocessing" and like terms are employed herein to refer to a reaction in which there is net consumption of hydrogen. It includes operations in which only impurities, such as sulfur and nitrogen compounds, are hydrogenated without a material alteration in the boiling range of the hydrocarbon charge, as well as operations wherein the hydrogenation is accompanied by substantial cracking to produce substantial quantities of hydrocarbon material boiling below the charge stock.

This invention will be best understood by referring to the attached drawing. This drawing shows a fractionation column 10 designed to separate a hydrocarbon charge stock, such as crude petroleum stock, into a plurality of components. These fractions might typically consist of an overhead gas stream taken through line 11, a light straight run naphtha taken through line 12, a heavy straight run naphtha recovered at 13, a straight run fuel oil taken at line 14, a light straight run gas oil removed through line 15, a heavy staight run gas oil removed at line 16 and a bottoms fraction removed through line 17.

In a typical installation the light straight run naphtha might boil within the range 50° F. to 180° F., the heavy straight run naphtha 180° F. to 380° F. The straight run fuel oil might boil from 400° F. to 550° F., the light straight run gas oil 450° F. to 650° F., and the heavy straight run gas oil from 600° F. to 850° F.

Overhead gases may be passed through line 18 to an alkylation unit 19. The light straight run naphtha is often of suitable quality and octane level that it may be passed through line 12 directly into the gasoline pool 20. Where its octane level is not sufficiently high it may be blended with the heavy straight run naphtha in line 13 by passage through line 21 and both naphthas supplied via lines 13 and 22 to reforming unit 23. The reforming unit may be of any conventional design, for example, it may employ pelleted platinum on alumina catalyst in a fixed bed and may operate at temperatures of the order of 900° F. and pressures of about 500 p.s.i.a.

The straight run fuel oil cut may pass through line 14 directly to the middle distillate pool 24. Alternatively it may be blended by means of line 25 with the light straight run gas oil in line 15 to be handled in the manner described hereinbelow.

The bottoms from fractionator 10 are removed through passage 17. In the usual case there will be substantial overlap in boiling range between the bottoms and the heavy gas oil removed through line 16. A portion of these bottoms may be blended into residual fuel oil at 41 by means of line 72. A portion also may be passed directly into coking zone 32 by means of line 27. The major portion of the bottoms, however, should preferably be supplied to vacuum separator 26. In the vacuum separator a sufficiently reduced pressure is maintained to vaporize substantial quantities of the charge thereto. The vacuum gas oil taken overhead from separator 26 through line 29 might typically boil within the range 650° F. to 900° F. A side stream is also taken from the vacuum separator 26 of similar boiling range to the overhead and is removed through line 30 to be processed in a manner described hereinbelow. The heavy hydrocarbon material which is not vaporized in vacuum separator 26 is removed through line 31 and is passed via lines 31 and 27 into a coking zone 32.

The coker 32 may be any conventional type of thermal operation designed to produce lower boiling hydrocarbons and solid carbon or coke from high boiling hydrocarbons. The most common type of coking operation is the delayed coking process in which the charge, after being heated to a suitable temperature, for example, 900° F., is supplied to a large drum in which the coke is deposited while the lighter materials pass overhead. The coking process may also be one which employs a compact bed of inert granular solids, such as described in United States Patent No. 2,561,334, or one employing a fluidized bed of inert solids such as described in United States Patent No. 2,608,526. Coking is normally carried out at temperatures within the range 850° F. to 1400° F. and pressures of 1 to 50 p.s.i.g. The liquid and vapor products of the coking reaction may be passed through line 33 into distillation column 34. The gases may be blended via line 35 with the gases from fractionator 10 and passed to alkylation unit 19. Light coker naphtha boiling, for example, within the range 50° F. to 180° F., may be treated at 71 to remove sulfur and to stabilize and then blended directly into gasoline pool 20 by means of line 36. The treatment provided at 71 may typically be acid treating or hydrogenation.

The heavy coker naphtha will usually require reforming and will be passed through line 37 to reformer 23. Coker gas oil which typically might boil within the range 380° F. to 800° F. is removed through line 38 and is handled as described hereinbelow. Material heavier than the gas oil is normally recycled by means of lines 39 and 40 to the coking operation. A part or all of this heavy material may be blended into residual fuel oil at 41 by means of line 42. In some specific cases some of this heavy material may be added to the gas oil through line 43. The coker gas oil in line 38 and the vacuum gas oil and heavy straight run gas oil in line 16 are blended and passed into a hydroprocessing unit 44. Some of the coker gas oil may also be used to reduce the viscosity of the residual fuel oil by blending it therewith at 41 through line 70.

In hydroprocessing unit 44 the hydrocarbon materials are reacted with hydrogen so that there is a net consumption of hydrogen. The hydroprocessing unit may be operated under relatively mild conditions which effect saturation of olefins, removal of nitrogen, sulfur and metals from the hydrocarbons without substantial conversion to lower boiling materials. On the other hand, it may be operated to produce substantial quantities of lower boiling material, particularly naphtha. It is a requirement of this invention, as described more fully below, that the hydroprocessing and the coking unit be operated in conjunction with each other to produce a hydroprocessed gas oil which is capable of vaporization at the pressure maintained in the catalytic cracking zone, also described below, without substantial thermal conversion.

The products of the hydroprocessing unit are passed through 45 into a fractionator 46. The gases produced will usually be removed from the system through line 73. If this gas is sufficiently high in isobutane content, however, it will be passed via lines 47 and 18 into alkylation unit 19. Naphtha produced flows through line 22 into reformer 23. If desired, a middle distillate cut may be taken and passed through line 48 into the middle distillate pool 24. Alternatively this material may be taken as a single cut with, or blended with, the hydroprocessed gas oil in line 49. Typically, this hydroprocessed gas oil might boil within the range 400° F. to 800° F. As explained below, it should not be so heavy that it cannot be vaporized at the pressure maintained in the catalytic cracking reaction zone. Any material heavier than the hydroprocessed gas oil may be recycled to the hydroprocesser through line 50.

The conditions of conversion in the hydroprocessing zone vary widely, depending on the degree of conversion desired, the charge stock and the catalyst employed. Temperatures of conversion within the range of 400° F. to 1000° F. are usual, although higher temperatures have been suggested. In general, it is preferable to maintain the conversion temperature within the range 500° F. to 900° F. because at the higher temperatures excessive production of gas is often encountered. Hydrogen pressures from a few hundred pounds per square inch to a few hundred atmospheres have been suggested. In general, however, pressures within the range 500 to 3000 pounds per square inch have found the most favor. The space velocity in volumes of hydrocarbon reactant (as 60° F. liquid) per volume of catalyst per hour should normally be within the range 0.1 to 10 and the molar ratio of hydrogen to hydrocarbon in the reaction zone should usually be within the range 2 to 80.

Since hydroprocessing is capable of upgrading entirely the charge thereto, it is possible to operate so that there is no material heavier than the hydroprocessed gas oil, even though the charge to the hydroprocessing unit may be heavier. If desired, some of the hydroprocessed gas oil may also be recycled by means of lines 51 and 50.

The hydroprocessing zone may employ any catalysts suitable to hydrogenate or hydrocrack hydrocarbons. Among the preferred catalyst is that described and claimed in United States patent application Serial No. 760,646, filed September 12, 1958. This catalyst is a composite of 15 to 40 percent by weight silica, 3 to 20 percent by weight molybdenum trioxide, 1 to 8 percent by weight cobalt oxide and the remainder alumina. Another preferred catalyst is that described and claimed in United States patent application Serial No. 418,166, filed March 23, 1954. This catalyst is made up of 0.05 to 20 percent by weight of certain specified metals, such as platinum deposited on a base such as silica-alumina, having a specified minimum cracking activity.

Hydroprocessed gas oil and light straight run gas oil in lines 15 and 49 are blended and passed into heater 52. In addition, there is also passed into heater 52, by means of lines 30 and 15, the vacuum tower side stream. In heater 25 sufficient heat is supplied to the liquid to vaporize the light straight run gas oil and hydroprocessed gas oil. The supply of heat should, however, be insufficient to thermally convert, in any substantial degree, the vacuum tower side stream. The vapors so formed are separated from the liquid in a phase separator 53 and passed through line 54 to catalytic cracking unit 55. The liquid from the phase separator, which is the essentially unchanged vacuum tower side stream, is passed through lines 56 and 27 to coking zone 32 to be converted therein.

The use of the vacuum tower side stream in the manner above indicated is an important part of the operation of this invention. It has been found that if hydrocarbons are vaporized completely in a heater so that no liquid is present, there will be substantial coking of the hydrocarbons in the heater tubes as they go through the dew point. The use of the vacuum tower side stream, which does not vaporize in the heating operation, will prevent this coking. There should be a sufficient quantity of this vacuum tower side stream that it amounts to about 10 percent to 15 percent of the total liquid supplied to heater 52. The boiling range of the vacuum tower side stream should, of course, be such that at least a major part of it will not vaporize at the temperatures needed to vaporize the light straight run and hydroprocessed gas oil. The boiling range of the side stream will usually correspond closely to the boiling range of the vacuum gas oil. It will usually fall within the range 600° F. to 1000° F. and preferably should be within the range 700° F. to 950° F.

Catalytic cracking unit 55, in this invention, operates entirely on vapor feed. Thus, there is no necessity for the elaborate liquid feed devices required in the prior art. This is true even though the over-all process operates to convert to gasoline material substantially heavier than that which can be vaporized at the catalytic cracking reaction pressure. The catalytic cracking unit employed herein is the conventional moving bed type. It may employ any of the conventional cracking catalysts, for example, synthetic silica-alumina. Usually such units are operated at pressures slightly above atmospheric, for example, 5 to 30 p.s.i.g. The conversion temperature will usually be within the range 600° F. to 1000° F. The catalytic cracking operation will employ suitable means for continuously burning the carbonaceous contaminant which the reaction deposits on the catalyst so that catalyst is continually reconditioned for re-use in the conversion.

The products of catalytic cracking are supplied via line 57 to a fractionator 58. The gases from the fractionator may pass through lines 59 and 18 to alkylation unit 19. Gasoline products are passed through line 60 into the gasoline pool 20. The middle distillate material passes through line 61 into the middle distillate pool 24. A catalytic gas oil may be recycled to the catalytic cracking operation via line 62. Any material heavier than gas oil is blended through line 63 into residual fuel oil at 41.

The alkylation unit 19 will, of course, include facilities for separating from the various gas streams supplied to it the butane-butene cut which is suitable for alkylation. Most commonly this alkylation step will use a sulfuric acid or a hydrofluoric acid catalyst and operate at a temperature within the range 32° F. to 90° F. The pressure used will depend upon the particular catalyst employed, about 40 p.s.i.g. being common with sulfuric acid and 140 p.s.i.g with hydrofluoric acid. The gasoline produced by alkylation is passed into gasoline pool 20 via line 64.

Further gasoline is, of course, produced by reformer 23 and is blended into gasoline pool 20 via line 65. The excess hydrogen produced by reformer 23 will be used to fill the needs of hydroprocessing unit 44. The four carbon atom components of the reformer gas may be passed to alkylation unit 19 through lines 66, 59 and 18. Any conventional equipment for separating these gases (not shown) may be used.

The gasoline pool 20 will, of course, in conventional practice, be split up into the various grades of gasoline which a refinery produces. Likewise, the middle distillate may be divided into domestic fuel oil, diesel oil, kerosine and the like.

It is a requirement of this invention that conditions in the hydroprocessing unit and in the coker should be correlated with each other so that the hydroprocessed gas oil can be vaporized at the catalytic cracking reaction zone pressure without substantial thermal conversion of the charge in the feed preparation system. This will involve not only the various reaction conditions such as temperature, pressure, residence time, etc., in both units but, also, the boiling range of the coker gas oil passed to the hydrocracker and the amount and boiling range of the recycle to both units.

By this correlation and the combination of this invention, then, conversion to gasoline and middle distillates of a substantial quantity of crude hydrocarbons, including substantial quantities of that portion of the crude which will not vaporize without thermal conversion at catalytic cracking zone pressures, is possible without the necessity of feeding liquid to the catalytic cracking unit.

In addition to avoiding the necessity for liquid feed apparatus in the catalytic cracking zone, this system offers other advantages over systems which employ liquid feed in the cracking reactor where the charge stock contains substantial quantities of nitrogen, metals and other such impurities which act to poison the cracking catalyst and reduce its ability to convert the charge to it. Hydroprocessing removes these materials very readily and, thus, provides a catalytic cracking charge stock which is more easily and fully converted to lower boiling products.

In the prior art it is known to coke the heavier portions of a hydrocarbon charge and pass the coker gas oil to a catalytic cracking operation. The difficulty here is that the nitrogen and other poisons, which usually concentrate in the heavier portions of the charge, are carried over into the coker gas oil and act to poison the cracking catalyst.

Likewise, it has been suggested that catalytic cracking charge stocks be hydrogenated. However, to hydrogenate all of the heavy materials upon which this invention operates would involve prohibitively high hydrogen consumption. The use of the coker in this invention in effect removes carbon from the heavier materials and, thus, when the resulting gas oils are hydroprocessed the hydrogen consumption will usually not exceed by a substantial amount the hydrogen produced by reforming in the conventional refinery.

This invention is particularly suited to the expansion of existing refineries. Most refineries employ catalytic cracking and many also utilize coking. When such refineries desire to increase their gasoline and middle distillate production, the addition of a hydroprocessing unit in the manner herein indicated will frequently have many advantages over an increase in catalytic cracking capacity, particularly where the crude being processed is high in materials which poison the cracking catalyst. By its substantial improvement of the catalytic cracking feed stock, substantially increased yields of gasoline and middle distillates are obtained from processing the same quantity of charge stock in the catalytic cracker. Higher octane gasoline of lower nitrogen and sulfur content may be achieved. The gasoline produced may be more susceptible to improvement in octane level by the addition of tetraethyl lead. The production of residual fuel oil, an unprofitable item, may be reduced.

There are certain alternative operations which also fall within the scope of this invention. Returning to the drawing, it may be desirable in some cases to send the light straight run gas oil through the hydroprocessing unit by means of lines 15, 67 and 16. The quality of this stock as a catalytic cracking charge stock will be improved by hydroprocessing since nitrogen, metals and sulfur will be lower. Hydroprocessing of light straight run gas oil, in addition to the vacuum gas oil and coker gas oil, will require a substantially larger hydroprocessing unit. However, the additional cost of this larger unit may, in part or completely, be offset by the increased yields obtained particularly by an increased naphtha production in the hydroprocessor, which naphtha, when reformed, may yield a sufficiently large quantity of hydrogen to avoid any need for a costly hydrogen producing plant.

It will be recalled that the drawing shows a vacuum tower side stream mixed by means of line 30 with the gas oils which are to be vaporized in heater 52 in order to minimize coking of the gas oils in the heater. In some applications, it may be that some of the heavy material will be entrained in the vaporized gas oils and carried into the catalytic cracker and there, because of its substantial quantity of catalyst poisons, inhibit the catalytic cracking reaction. This may be avoided by passing the vacuum tower side stream into the hydroprocessing unit with the vacuum tower gas oil by means of lines 30, 68 and 16. This will remove the catalyst poisons and the heavy hydrogenated material may then be added to the gas oils in heater 52 by means of lines 51 and 49.

As indicated, it is necessary to this invention that conditions in the hydroprocessing unit and in the coker be correlated to produce a hydroprocessed gas oil which can be vaporized at the pressure maintained in the catalytic cracking zone without substantial thermal conversion. The boiling range of this gas oil will, therefore, depend on the pressure in the catalytic cracker. However, for most commercial applications of the moving mass type of catalytic cracker, the end boiling point of the hydroprocessed gas oil and any straight run gas oil which is to be supplied to the catalytic cracker should not exceed 900° F. so that vaporization without substantial thermal conversion may be effected.

*Example I*

Referring to the drawing, an operation on a crude petroleum stock of the California type will be described. 52,000 barrels per day of a reduced crude whose initial boiling point is 650° F. and which has a nitrogen content of 1.0 weight percent and a sulfur content of 2.0 weight percent might be passed via lines 17, 27 and 28 to vacuum separator 26. A stream of vacuum gas oil amounting to 18,576 barrels per day and distilling between 650° F. and 900° F. may be taken overhead from separator 26 with a nitrogen content of 0.3 weight percent and a sulfur content of 1.1 weight percent. A vacuum tower side stream could also be removed from separator 26, distilling from 700° F. to 950° F. and amounting to 4,024 barrels per day. The bottoms from separator 26 amounting to 29,400 barrels per day would be coked in a delayed type coker at a temperature of about 900° F. and a pressure of 50 p.s.i.g. The coking produces as one product a coker gas oil distilling between 380° F. and 750° F. and having a nitrogen content of 0.4 weight percent and a sulfur content of 1.2 weight percent. The quantity of this coker gas oil which is not blended into residual fuel oil would amount to about 4,378 barrels per day. The coker gas oil and vacuum gas oil amounting together to 28,670 barrels per day would be charged to a hydroprocessing unit together with 18,536 barrels per day of light and heavy straight run gas oils produced from the crude, distilling between 450° F. and 750° F. and having a nitrogen content of 0.15 weight percent and a sulfur content of 0.9 weight percent. The hydroprocessing unit might be operated to produce from the charge about 24 percent by volume of material boiling below 390° F. The hydroprocessing unit might employ ⅛ x ⅛ inch pellets of a catalyst comprising 15 percent by weight silica, 2.5 percent by weight cobalt oxide, 8 percent by weight molybdenum trioxide and 74.5 percent by weight alumina. The temperature in the hydroprocessing unit might vary, as the catalyst ages, between 830° F. and 890° F. at 2.0 liquid hourly space velocity and it might employ a hydrogen partial pressure of about 1500 p.s.i.a. A hydrogen consumption of about 450 cubic feet per barrel of charge could be expected. The hydroprocessed gas oil produced could distill between 400° F. and 800° F. and amount in quantity to 31,555 barrels per day. It might have a nitrogen content of 0.02 weight percent and a sulfur content of 0.01 weight percent. This gas oil would be vaporized in the presence of the vacuum tower side stream and catalytically cracked in a Thermofor Catalytic Cracker employing a clay type catalyst at a temperature of about 925° F. and a pressure of about 15 p.s.i.g. The catalytic cracker might consist of a multiplicity of reactors and regenerators. Employing a reformer with a platinum type reforming catalyst operating at 500 p.s.i.g. and processing the 28,939 barrels per day of straight run, thermal and hydroprocessed naphtha, this system would supply sufficient hydrogen for the hydroprocessing unit and the naphtha pretreater used on the reformer. Including the gasoline manufactured by alkylation and isomerization of the gases produced, this system manufactures about 58,068 barrels per day of motor gasoline having 101.1 octane number with 3 cubic centimeters per gallon of tetraethyl lead.

*Example II*

In an operation wherein 10,256 barrels per day of light straight run gas oil is charged directly to the catalytic cracking unit rather than the hydroprocessor, the hydroprocessor would handle a total of 31,983 barrels per day. The hydroprocessor might be operated under about the same conditions indicated in Example I, except that the initial reaction temperature might be 840° F. About 17 percent by volume of material boiling below 390° F. based on charge to the unit would be produced. The hydro-processed gas oil would boil between 400° F. and 865° F. with a nitrogen content of 0.04 weight percent and a sulfur content of 0.01 weight percent. In quantity it would amount to 26,517 barrels per day. The hydrogen consumption would be about 650 cubic feet per barrel of charge to the hydroprocessor. A suitable reforming system would produce more hydrogen than consumed in the hydroprocessor and naphtha pretreater. This operation, with appropriate alkylation and isomerization facilities, could produce 58,068 barrels per day of motor gasoline having 101.6 octane number with 3 cubic centimeters per gallon of tetraethyl lead.

The foregoing description makes use of such terms as "light gas oil," "heavy gas oil," vacuum gas oil," "coker gas oil" and the like. Certain specific examples of boiling ranges of these materials have been given. It will be appreciated that the exact boiling ranges in each specific case will particularly depend upon the crude being processed. In general, however, suitable light straight run gas oils will boil within the broad range 400° F. to 700° F. and heavy straight run gas oils and vacuum gas oils within the range 600° F. to beyond 1000° F. The coker gas oil boiling range which may be used in this invention will depend very largely on the degree of conversion to be used in the hydroprocessing unit. It will usually fall within the range 350° F. to 900° F. and more likely within the range 380° F. to 800° F. The hydroprocessed gas oil, as stated, must be capable of vaporization without thermal conversion at the catalytic cracking zone pressure. It will, therefore, usually boil within the range 380° F. to 900° F. and more usually 380° F. to 750° F.

This invention should be understood to cover all changes and modifications of the examples of the invention, herein chosen for purposes of disclosure, which do

We claim:

A process for producing gasoline and fuel oil from a crude petroleum charge, which comprises: maintaining a catalytic cracking zone under catalytic cracking conditions with a downwardly moving, substantially compact reaction bed of granular cracking catalyst therein; separating a light straight run gas oil from said crude petroleum charge, which gas oil will vaporize entirely without substantial thermal conversion at the pressure maintained in said catalytic cracking zone; separating a heavy straight run gas oil from said charge; passing material from said charge boiling above heavy straight run gas oil to a confined coking zone and coking said material to produce coker naphtha and coker gas oil; passing the coker gas oil and heavy straight run gas oil into a hydroprocessing zone and reacting said gas oils with hydrogen therein to produce hydroprocessed naphtha and hydroprocessed gas oil; removing all of the straight run naphtha from said charge and passing all of said straight run naphtha, said coker naphtha and said hydroprocessed naphtha into a reforming zone and reforming said naphthas therein to produce high octane naphtha and hydrogen; passing hydrogen from the reforming zone to the hydroprocessing zone to supply the hydrogen consumed in the hydroprocessing zone; controlling the conditions in the hydroprocessing zone and the coking zone so that the hydrogen consumed in the hydroprocessing zone does not exceed the hydrogen produced in the reforming zone and the hydroprocessed gas oil may be entirely vaporized at the pressure maintained in the catalytic cracking zone without substantial thermal conversion; mixing the light straight run gas oil and the hydroprocessed gas oil with at least 10 volume percent of a higher boiling hydrocarbon material and flashing said gas oils from the mixture under conditions such that at least the major portion of the higher boiling hydrocarbon material remains in the liquid phase; separating the vaporized light straight run and hydroprocessed gas oils from the remaining liquid and passing this vapor into and through the catalytic cracking zone to be converted to lower boiling products, whereby the catalytic cracking zone operates only on vapor feed.

References Cited in the file of this patent

UNITED STATES PATENTS

| | | |
|---|---|---|
| 2,380,897 | Murphree et al. | July 31, 1945 |
| 2,691,623 | Hartley | Oct. 12, 1954 |
| 2,727,853 | Hennig | Dec. 20, 1955 |
| 2,737,474 | Kimberlin et al. | Mar. 6, 1956 |
| 2,739,929 | Madinger | Mar. 27, 1956 |
| 2,871,182 | Weekman | Jan. 27, 1959 |
| 2,911,353 | Watts et al. | Nov. 3, 1959 |